US009417987B2

(12) United States Patent
Vaidyanathan et al.

(10) Patent No.: US 9,417,987 B2
(45) Date of Patent: Aug. 16, 2016

(54) ADVISORY WARNING AND WORKAROUND INDICATIONS TO USER WHEN STOPPED BETWEEN LOAD AND STORE CONDITIONAL INSTRUCTIONS WHILE USING SOURCE LEVEL DEBUGGERS

(75) Inventors: Basu Vaidyanathan, Austin, TX (US); Kavana Nandikur Bhat, Bangalore (IN); Nitin Kumar, Bangalore (IN)

(73) Assignee: International Business Machines Corporation, Armonk, NY (US)

(\*) Notice: Subject to any disclaimer, the term of this patent is extended or adjusted under 35 U.S.C. 154(b) by 2496 days.

(21) Appl. No.: 12/137,683

(22) Filed: Jun. 12, 2008

(65) Prior Publication Data

US 2009/0313610 A1    Dec. 17, 2009

(51) Int. Cl.
*G06F 9/44*    (2006.01)
*G06F 11/36*    (2006.01)

(52) U.S. Cl.
CPC .................................. *G06F 11/362* (2013.01)

(58) Field of Classification Search
USPC ........................................................ 717/129
See application file for complete search history.

(56) References Cited

U.S. PATENT DOCUMENTS

| 5,664,159 | A | * | 9/1997 | Richter et al. | 703/23 |
| 6,077,312 | A | * | 6/2000 | Bates et al. | 717/129 |
| 6,550,056 | B1 | * | 4/2003 | Mizumoto et al. | 717/124 |
| 6,839,893 | B2 | * | 1/2005 | Bates et al. | 717/124 |
| 6,848,097 | B1 | * | 1/2005 | Alverson et al. | 717/124 |
| 8,185,879 | B2 | * | 5/2012 | Thekkath et al. | 717/128 |
| 2002/0199173 | A1 | | 12/2002 | Bowen | |
| 2003/0079206 | A1 | | 4/2003 | Bates et al. | |
| 2006/0070039 | A1 | * | 3/2006 | Bates et al. | 717/129 |
| 2006/0195721 | A1 | * | 8/2006 | Moyer et al. | 714/30 |
| 2007/0101327 | A1 | | 5/2007 | Burdick et al. | |
| 2008/0005193 | A1 | * | 1/2008 | Lev et al. | 707/202 |
| 2008/0168428 | A1 | * | 7/2008 | Bates et al. | 717/129 |
| 2009/0089547 | A1 | * | 4/2009 | Moyer | 712/205 |

\* cited by examiner

*Primary Examiner* — Ryan Coyer
(74) *Attorney, Agent, or Firm* — Yee & Associates, P.C.; Damion Josephs

(57) ABSTRACT

A load store advisory program sets a breakpoint within a load-store sequence of a program, determines if the breakpoint will cause unexpected behavior, and generates a warning if it is determined that the breakpoint will cause unexpected behavior. The unexpected behavior may be the result of setting a breakpoint within a load-store sequence that, because of the breakpoint, will repeatedly fail.

14 Claims, 4 Drawing Sheets

```
dbx ./step
Type 'help' for help.
reading symbolic information ...
(dbx) list
1 #include <sys/atomic-op.h>
2
3 int main() {
4 long value=0;
5
6 fetch_and_addlp(&value,1L);
7 }
8

(dbx) listi fetch-and-addlp
0xd034c308 (fetch-and-addlp) 816206b0 lwz r11,0x6b0(r2)
0xd034c30c (fetch-and__addlp+0x4) 546707be rlwinm r7,r3,0~0,0xle,0xlf
0xd034c3 10 (fetch_and_addlp+0x8) 81 8b0004 iwz r12,0x4(r11)
0xd034c3 14 (fetch-and-addlp+0xc) 0f070000 twnei r7,0x0
0xd034c3 18 (fetchand-addlp+0x10) 71 8~0007 andi. r12,r12,0x7
0xd034c3 1c (fetch_and_addlp+0x14) 4082001~ bne 0xd034c338 (fetch_and_addlp+0x30)
0xd034c320 (fetch_and_addlp+0xlX) 7c681b78 mr r8,r3
410 ──► 0xd034c324 (fetch-and-addlp+0xlc) 7~604028 lwarx r3,r0,r8 ────> This instruction will
make the reservation.
0xd034c328 (fetch__and_addlp+0x207) ca32214 add r5,r3,r4
420 ──► 0xd034c32c (fetch_and_addlp+0x24) 7ca0412d stwcx. r5,r0,r8 ────> This instruction
updates the memory location, if reservation still exists.
422
(dbx) stopi at 0xd034c328 ────> Here a breakpoint is set at an instruction
between the lwarx and stwcx.
[l] stopi at 0xd034c328 (fetch_and_addlp+0x20)
(dbx) Nn
[l] stopped in fetch-and-addlp at 0xd034c328
0xd034c328 (fetch_and_addlp+0x20) 7ca32214 add r5,r3,r4
(dbx) cont
430 ──► [l] stopped in fetch-and-addlp at 0xd034c328 ────> stwcx fails each time the
debuggee is stopped at the breakpoint. The application is in a loop and the user is unaware of the
reason for the application to loop.
0xd034c328 (fetch_and_addlp+0x20) 7ca32214 add r5,r3,r4
(dbx) cont
[l] stopped in fetch-and-addlp at 0xd034c328
0xd034c328 (fetch_andaddlp+0x20) 7ca32214 add r5,r3,r4
(dbx) cont
[l] stopped in fetch-and-addlp at 0xd034c328
0xd034c328 (fetch  and  addlp+0x207) ca32214 add r5,r3,r4
```

ADVISORY WARNING AND WORKAROUND INDICATIONS TO USER WHEN STOPPED BETWEEN LOAD AND STORE CONDITIONAL INSTRUCTIONS WHILE USING SOURCE LEVEL DEBUGGERS

FIELD OF THE INVENTION

The invention relates to debuggers, generally, and specifically to setting breakpoints and stepping through a program with a debugger.

BACKGROUND OF THE INVENTION

Modern computer architectures comprise multiple processors running multiple threads that may each access common memory spaces. In order to prevent these processors and threads from concurrently accessing and modifying the same data at the same time, some modern architectures, such a PowerPC, provide for placing a reserve on the memory address. A reserve allows a program code to view and update data values without jeopardizing data integrity.

When a reservation is not placed, and two threads each attempt to increment data in the same memory address, both threads may read the data from the address, increment the data, and then attempt to write the modified data back to the memory address. When the second thread reads from the memory address before the first thread has written its modified data back to the memory address, the first thread's modification will be lost because the second thread will overwrite the first thread's modification. Thus, data integrity is jeopardized.

When a reserve is used, both threads may place a reserve on the memory address after reading the data. When the second thread reads from the memory address before the first thread has written its modified data back to the memory address, the second thread's reserve invalidates the first thread's reserve. With its reserve invalidated, the first thread's write will fail, and the first thread may then retry its increment of the memory address. Thus, the increments of both threads will be applied to the data at the memory address because even though the second thread interrupted the first thread's access, the first thread may repeat its access so that both the first and second thread's increments will be applied to the data at the memory address.

A modern processor architecture that uses reserves is the PowerPC architecture. The PowerPC architecture provides an instruction set with the commands "lwarx" and "stwcx." The lwarx instruction loads data from a memory address and places a reserve on that address. The stwcx instruction stores data to an address only if the reserve placed by the lwarx instruction is still intact. The sequence of loading and then storing data is known as a load-store sequence. In the PowerPC architecture, the load-store sequence may be referred to as a lwarx-stwcx sequence. Using the lwarx-stwcx sequence may ensure that no other processor or thread has modified the data between the time the lwarx instruction is executed and the time the stwcx instruction completes.

In addition, programs using a load-store sequence with a reserve may loop continuously until the data that was loaded and modified is successfully stored. For example, a PowerPC program using a lwarx-stwcx sequence may, when the stwcx instruction fails to store the data, loop back and attempt the lwarx-stwcx sequence again until the stwcx instruction succeeds.

Programs using these commands are typically debugged with the aid of a debugging program to test the program. Debugging programs provide for setting breakpoints within the program to allow the developer to observe the functioning of the program. Breakpoints will stop the execution of a program so that the developer may determine if the program is operating properly. Breakpoints may either be set manually by the developer, or breakpoints may be set automatically by the debugging program.

In order to set a breakpoint with a debugging program, modern debuggers will typically replace a program's instruction with a hardware interrupt or other breakpoint trap to halt the execution of the program and return control to the debugger. However, by changing the execution of the program, there is a risk that a reserve on a memory address will be lost. For example, a PowerPC processor can only place one reserve at a time. Thus, if a program places a reserve with the lwarx instruction and this program is then halted and execution is handed over to a debugger, then the process of halting and handing over execution may lose the reserve placed by the lwarx instruction such that the subsequent stwcx instruction will fail.

The lwarx and stwcx instruction pair enables a program code to view and update data values consistently without jeopardizing data integrity by placing a reservation for a specified memory location at the system bus level when loading data from this memory location by lwarx. Several instructions may follow the lwarx instruction until a conditional store is performed to store the updated data value onto this memory location. The load and store of a single data value is done as an atomic operation (an operation during which a processor can simultaneously read a location and write it in the same bus operation) such that any other store to this memory location on any CPU will make the reservation at this memory location disappear, stwcx will fail to store the updated data, and the update operation will be re-driven by the program code. Any hardware interruption or exception that occurs after the load reservation is set but before the stwcx instruction is executed will also remove the reservation.

Generally, source level debuggers (such as a dbx tool on AIX), operate by allowing the user to step one instruction at a time so that the user may view the register context and any memory update. For example, when performing a step at the lwarx instruction on the dbx tool, using the stepi or nexti subcommand, lwarx is executed, following instructions are processed, and a stop occurs at the instruction following the stwcx instruction. This stop occurs after stwcx because if a failure occurs, it occurs upon re-driving the execution back to the lwarx instruction.

Most debuggers implement stepping instructions by setting up a hardware exception at the end of execution of the instruction being stepped or by placing a breakpoint trap at the start of the next instruction. However, a problem occurs because the hardware prevents the stay of the load reservation placed by the lwarx instruction that was just stepped over. Therefore, the stwcx that follows will always fail, and the dbx user will step indefinitely over the instructions bounded by lwarx and stwcx. Thus, when stepi or nexti subcommand are issued in dbx, the dbx tool recognizes the current instruction as lwarx and places a breakpoint trap at the start of the instruction following stwcx and at the start of the instruction that may be encompassed by the lwarx and stwcx instruction sequence. In this way, dbx avoids stepping into any of the instructions present between the lwarx and stwcx but continues execution and stops outside of the lwarx and stwcx sequence.

A problem remains however, because if the user sets a breakpoint at an instruction in the middle of the lwarx and stwcx code sequence, the dbx tool has no way of detecting this. Thus, when the dbx tool is stopped at this instruction, the stwcx will fail, leaving an indefinite loop until the breakpoint is removed.

As such, a need exists to inform developers when stepping through programs or when setting a breakpoint in a program that the next step or breakpoint may unduly interfere with the program's execution.

SUMMARY OF THE INVENTION

A load store advisory program (LSAP) sets a breakpoint within a portion of a program, determines if the breakpoint will cause unexpected behavior, and generates a warning if it is determined that the breakpoint will cause unexpected behavior. The determination that a breakpoint will cause unexpected behavior may be triggered by the user setting a breakpoint within a load-store sequence or by the user stepping into a load-store sequence. Setting a breakpoint within a load-store sequence or stepping into a load-store sequence may cause the load-store sequence to repeatedly fail in an unexpected manner, resulting in unexpected behavior. The breakpoint may be set specifically by the user or may be a temporary breakpoint set by a debugger to facilitate the user stepping through the program.

The warning may be displayed to the user and may also include information regarding alternate breakpoints. The user may remove the breakpoint and replace it with one or more alternate breakpoints that are determined by the debugger to not cause the unexpected behavior.

These and other objects of the LSAP will be apparent to those skilled in the art from the following detailed description of a preferred embodiment of the invention.

BRIEF DESCRIPTION OF THE DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

FIG. 4 is an application showing failure caused by break point.

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the Load Store Advisory Program (LSAP).

Figure 1:
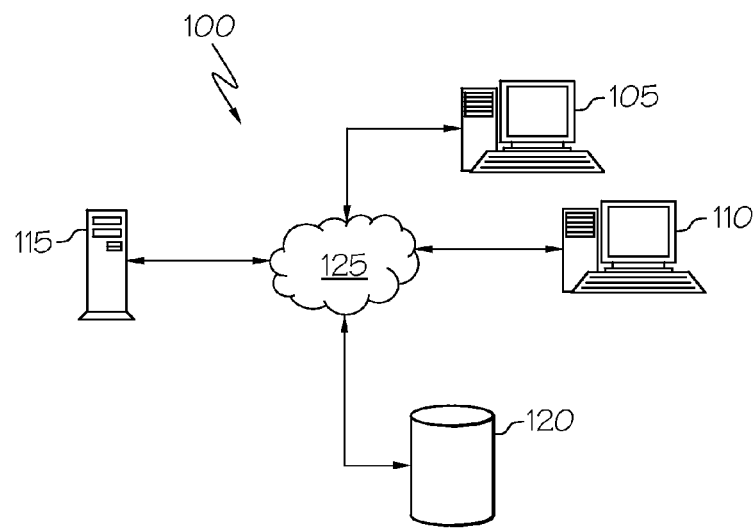
FIG. 1 depicts an exemplary computer network.

Additionally, the LSAP is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
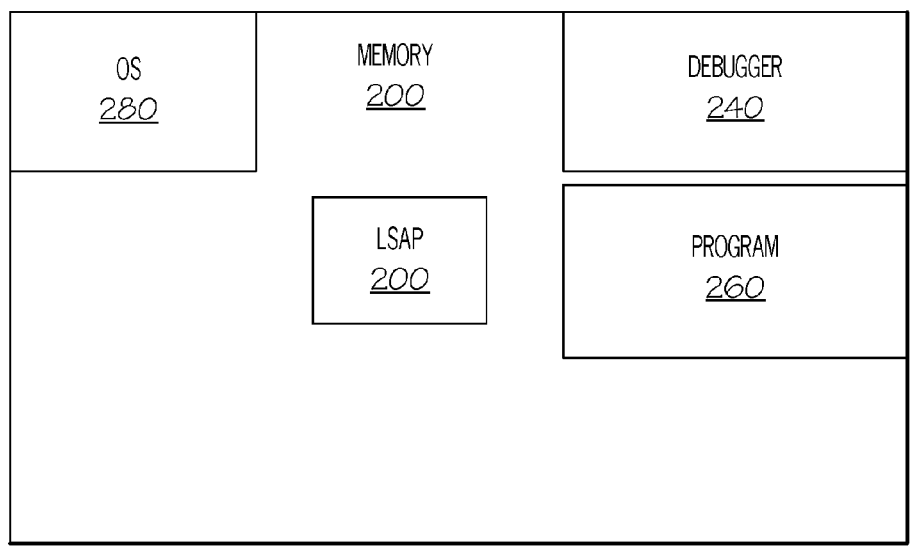
FIG. 2 depicts a memory containing the LSAP and other programs.

LSAP 200 typically is stored in a memory, represented schematically as memory 220 in FIG. 2. The term "memory," as used herein, includes without limitation any volatile or persistent medium, such as an electrical circuit, magnetic disk, or optical disk, in which a computer can store data or software for any duration. A single memory may encompass and be distributed across a plurality of media. Thus, FIG. 2 is included merely as a descriptive expedient and does not necessarily reflect any particular physical embodiment of memory 220. As depicted in FIG. 2, though, memory 220 may include additional data and programs such as operating system 280. Of particular import to LSAP 200, memory 220 may include one or more programs such as program 260 and debugger 240 with which LSAP 200 interacts.

Figure 3A:
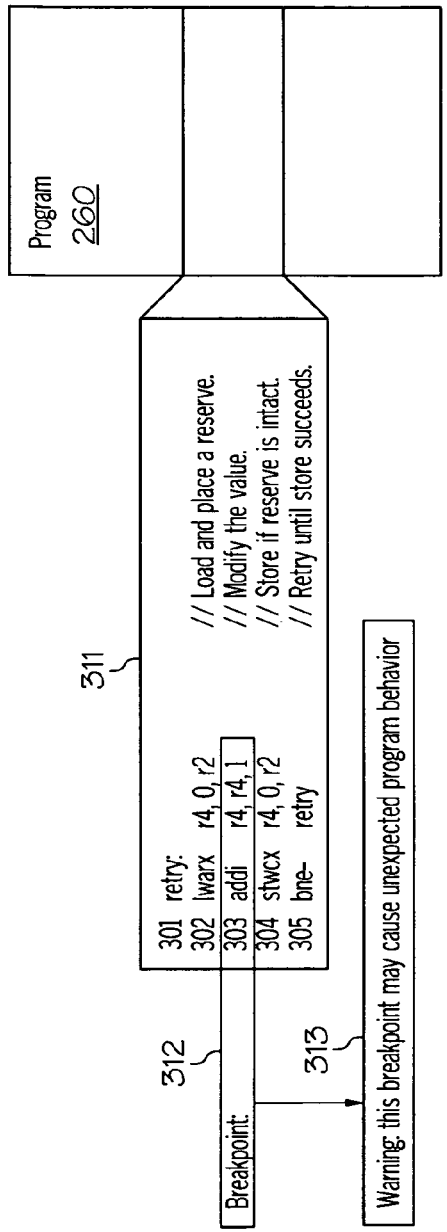
FIG. 3A is a diagram illustrating the interaction of the LSAP with a breakpoint.

FIG. 3A is a diagram illustrating the interaction of an embodiment of LSAP 200 with a program. Program 260 is being debugged by a debugger such as debugger 240 (see FIG. 2) and portion 311 is a portion of program 260 written using PowerPC instructions. Portion 311 operates to increment a value in memory. Line 301 is a label ("retry") indicating the beginning of this portion of the code. Line 302 loads the data from memory and places a reserve on that memory address using the lwarx instruction. Line 303 modifies the value by adding "1" to the current value using the addi instruction. Line 304 attempts to store the value back to the same memory address, but only if the reserve is still intact using the stwcx instruction. Line 305 will repeat this portion of the code—by branching back to line 301—if the stwcx instruction failed.

When the user sets breakpoint 312 at line 303 of portion 311 within program 260, the debugger determines whether breakpoint 312 will likely cause unexpected behavior of program 260. In this exemplary case, breakpoint 312 will cause unexpected behavior because it may cause an infinite loop. The infinite loop is created since the stwcx instruction will likely fail, even when it is expected to succeed. The stwcx instruction will likely fail because when breakpoint 312 halts the execution of program 260 the reserve placed by the lwarx instruction will be lost and the stwcx instruction will fail causing line 305 to branch back to line 301 and repeat portion 311. In subsequent repetitions, breakpoint 312 will continue to halt the program removing the reserve so that the stwcx instruction may never succeed. Hence, so long as breakpoint 312 is within the load store sequence, the store will repeatedly fail, the code will loop back to execute from the beginning of portion 311, and program 260's execution will halt at line 303.

When the debugger determines that breakpoint 312 will likely interfere with the execution of program 260, the debugger generates warning 313, which may be displayed to the user. Further embodiments of LSAP 200 may determine and suggest locations for one or more breakpoints before, after, or around the load-store sequence that will not cause unexpected behavior when set.

Figure 3B:
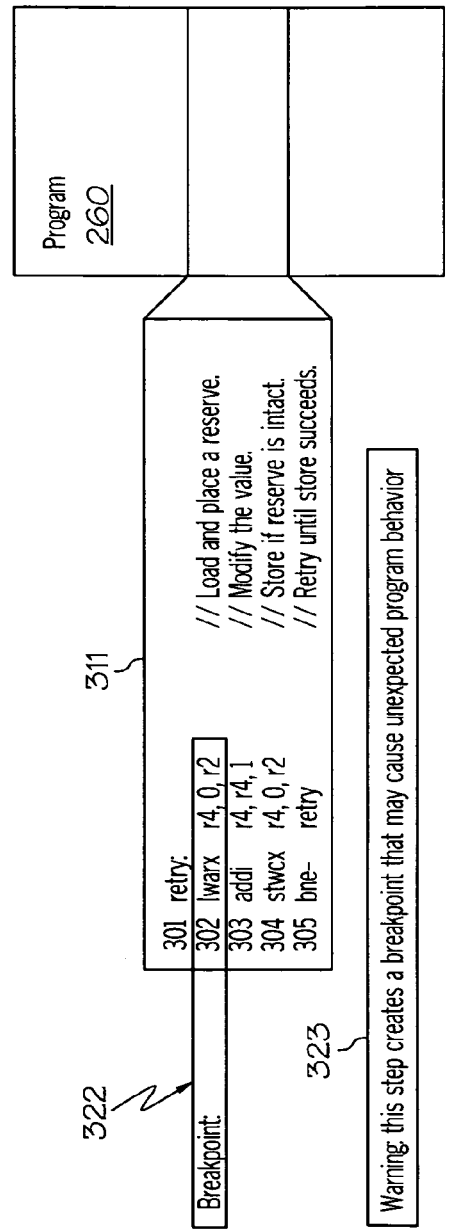
FIG. 3B is a diagram illustrating the interaction of the LSAP with step.

FIG. 3B is a diagram illustrating the interaction of LSAP 200 with a user stepping through program 260. FIG. 3B is similar to FIG. 3A except that instead of setting a breakpoint within program 260, the user is stepping through program 260 and program counter 322 is pointing to line 302.

When the user causes the debugger to step, the debugger determines whether these conditions may cause unexpected behavior of program 260. In this exemplary case, stepping at line 302 will cause unexpected behavior because it may cause an infinite loop of portion 311, much like in FIG. 3A. The infinite loop is created since the stwcx instruction will likely fail, even when it is expected to succeed. The stwcx instruction will likely fail because stepping at line 302 places a temporary breakpoint at line 302, which halts the execution of program 260 and causes the reserve placed by the lwarx instruction to be invalidated or lost. The stwcx instruction will fail because the reserve is lost, such that the command at line 305 will branch back to line 301 and repeat portion 311. In subsequent repetitions, stepping through portion 311 will continue to place breakpoints that halt the program and remove the reserve so that the stwcx instruction may never succeed. Hence, so long as the user steps through the load-store sequence, the store will repeatedly fail, the code will loop back to execute from the beginning of portion 311, and program 260's execution will halt at line 302.

When the debugger determines that the step will likely cause unexpected behavior of program 260, the debugger generates warning 323, which may be displayed to the user. Further embodiments of the invention may determine and suggest locations for one or more breakpoints before, after, or around the load-store sequence that will not cause unexpected behavior when set.

FIG. 4 is a depiction of application 400. The reservation is made at 410 and the memory is updated at 420. 422 is a breakpoint set at an instruction between the lwarx and stwcx. At 430 stwcx fails each time the debugger is stopped at the breakpoint. Program segment 400 is in a loop and the user is unaware of the reason for the application to loop.

Figure 5:
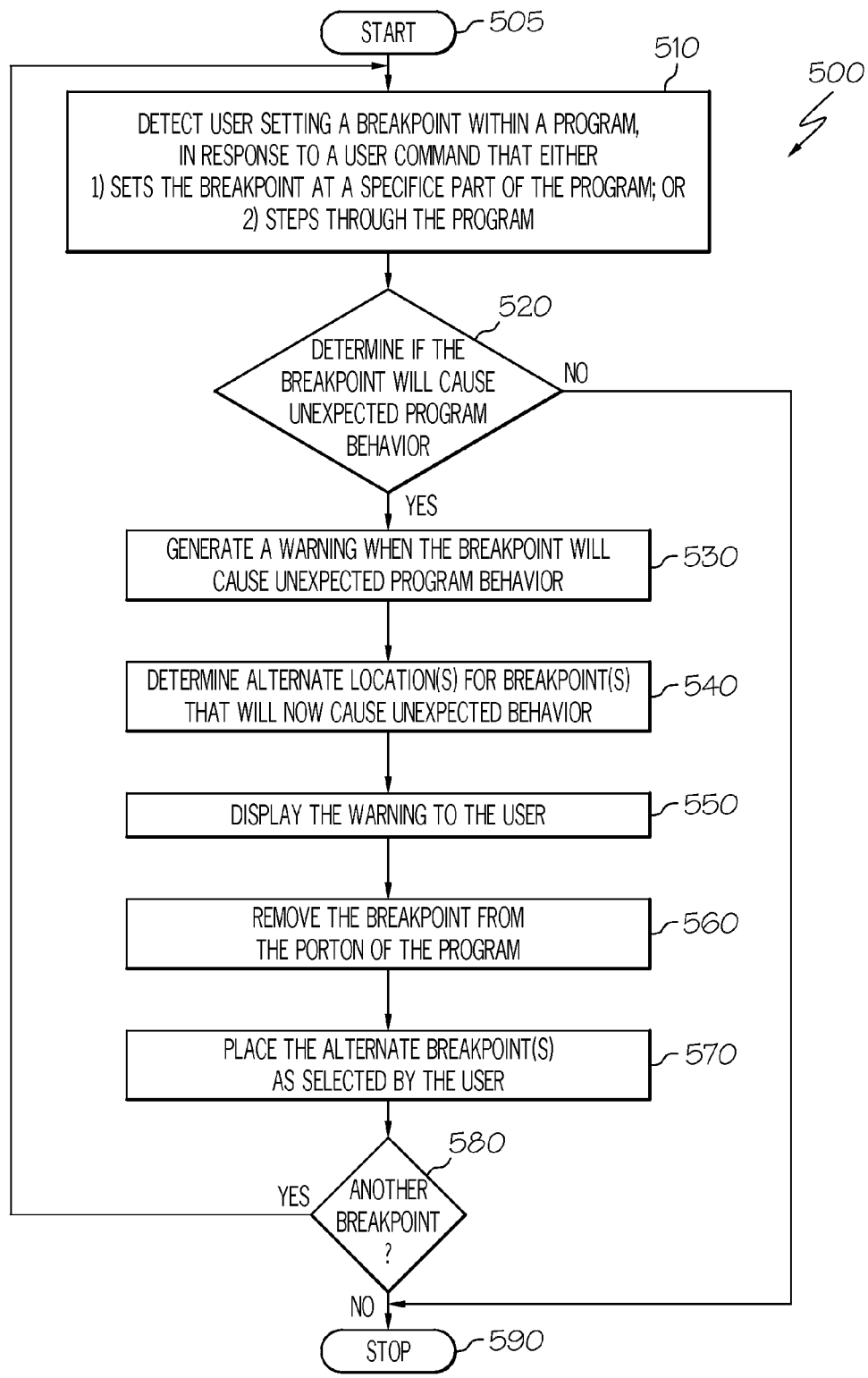
FIG. 5 is a flow chart depicting the advisory debugging program.

FIG. 5 is a flow chart illustrating method steps for LSAP 200. LSAP 200 starts at 505. At step 510, a user either sets a breakpoint within the program or "steps" through the program. To set a breakpoint, any number of methods may be used, as is commonly known in the art. For example, a user of a command line debugger may enter an instruction specifying the exact address within the program on which to set the breakpoint. Alternatively, a user of a graphical debugger may click on a line of code within the program that the debugger will correlate to a specific address within the program to set the breakpoint. Additionally, the user may "step" through the program. By "stepping" through the program the debugger may place a temporary breakpoint at the next line of code (or next address) and then execute the current line of code, such that the program will stop on the next line of code after executing the current line of code. A user may then "step" again, repeating the process. In this manner, the user may check the execution of every line of code to ensure proper operation of the program.

At step 520, it is determined whether the breakpoint placed in step 510 will cause unexpected program behavior. This determination may be triggered by the user placing a breakpoint within a load-store sequence or by the user stepping into a load-store sequence. Setting a breakpoint within a load-store sequence or stepping into a load-store sequence may cause the load-store sequence to repeatedly fail in an unexpected manner, resulting in unexpected behavior. The load-store sequence effects a read-modify-write operation that loads data from memory, modifies the data, and then stores the data back to memory. In a system with multiple processors or threads of execution, this load-store sequence needs to be protected from concurrent access to memory. Concurrent access is where more than one processor or thread accesses the same data within a memory. Problems arise when more than one thread or processor updates the value of a data in memory at the same time, as is known in the art. A way to avoid concurrent access is to place a reserve on the memory address used by the load store sequence. By reserving the memory address, one thread or processor's update will not be overwritten by another thread or processor's update. However, a reserve may be lost if a breakpoint is placed within the load store sequence, causing the store to unexpectedly fail, even though the store should have succeeded were it not for the breakpoint.

At step 530, a warning is generated when it is determined that the breakpoint set in step 510 will cause unexpected behavior of the program, as determined in step 520. This warning may include the reason why the unexpected behavior is likely to occur. As an example with a load-store sequence on a PowerPC processor using the lwarx and stwcx instructions, the warning may indicate that the breakpoint to be placed may lose the reserve placed by the lwarx instruction such that the subsequent stwcx instruction will fail, even if it is expected to succeed.

At step 540, alternate locations are determined for one or more alternate breakpoints that, when placed, will not cause the unexpected behavior as determined in step 540. Such alternate breakpoints may be placed before, after, or around the portion of code that behaves unexpectedly.

At step 550, the warning is displayed to the user. The warning may include further indications to the user for alternate breakpoints, as determined in step 540. As an example with a command line debugger, the debugger may display the warning and suggest that the use place the alternate breakpoints as determined in step 540. With a graphical debugger, the debugger may display a pop-up window with several clickable buttons to ascertain how the user will proceed.

At step 560, the current breakpoint (determined to cause unexpected behavior) is removed from the portion of the program where it is causing unexpected behavior. By removing the breakpoint the program should behave as expected.

At step 570, the alternate breakpoints are placed as selected by the user. As described above in step 550, the user may select alternate breakpoints by issuing commands to a command line debugger or by clicking on a button of a pop-up window.

It is noted that while embodiments of the invention are described that use the PowerPC architecture and instructions, the invention is not so limited. As an example, a program that updates data within a database may suffer from similar unexpected behavior. In that case, instead of a load-store sequence comprising the PowerPC lwarx and stwcx instructions, the load-store sequence may be function calls to load and store data to the database. In accordance with the invention, if the debugger determines that a breakpoint set within the load-store sequence used for accessing a database may cause unexpected behavior, the debugger may generate a warning.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed:

1. A computer program product comprising a non-transitory computer readable storage medium containing a plurality of instructions encoded thereon, the plurality of instructions being executable to cause a computing device to perform steps comprising:
   setting a breakpoint within a load-store sequence;
   determining if the breakpoint will cause the load-store sequence to repeatedly fail;
   generating a warning if it is determined that the breakpoint will cause the load-store sequence to repeatedly fail, wherein the plurality of instructions further cause the computing device to perform the step of displaying the warning to a user;
   determining locations for at least one alternate breakpoint, wherein the alternate breakpoint is not within the load-store sequence;
   removing the breakpoint from the program in response to a first user command; and
   setting at least one alternate breakpoint outside of the load-store sequence in response to a second user command.

2. The computer program product of claim 1 wherein the setting of the breakpoint is performed in response to a user using a debugger.

3. The computer program product of claim 1 wherein the breakpoint is a temporary breakpoint set automatically in response to a user stepping through the program.

4. The computer program product of claim 1 wherein the program repeatedly executes the load-store sequence until the breakpoint is no longer within the load-store sequence.

5. A method of debugging, comprising:
   a computer setting a breakpoint within a program;
   the computer determining whether the breakpoint is within a load-store sequence;
   the computer determining whether the breakpoint will cause the load-store sequence to repeatedly fail;
   the computer, responsive to determining that the breakpoint will cause the load-store sequence to repeatedly fail, displaying a warning to a user when the breakpoint is within the load-store sequence;
   the computer determining locations for at least one alternate breakpoint, wherein the alternate breakpoint is not within the load-store sequence;
   the computer removing the breakpoint from the program in response to a first user command; and
   the computer setting at least one alternate breakpoint outside of the load-store sequence in response to a second user command.

6. The method of claim 5, wherein the load places a reserve on a memory being accessed and the store only stores if the reserve remains intact.

7. The method of claim 5 wherein the breakpoint is a temporary breakpoint set automatically as a result of a user stepping through the program.

8. The method of claim 5 wherein if the store of the load-store sequence fails, the load-store sequence is repeated until the store succeeds.

9. A system for debugging a program, comprising:
   one or more processors, one or more computer readable memories, and one or more computer readable storage devices;
   a user input device connected to at least one of the one or more processors and to at least one of the one or more computer readable storage devices;
   computer program instructions stored on at least one of the computer readable storage devices for execution by at least one of the processors via at least one of the computer readable memories for setting, responsive to an input from the user input device, a breakpoint within a program;
   computer program instructions stored on at least one of the computer readable storage devices for execution by at least one of the processors via at least one of the computer readable memories for determining whether the breakpoint is within a load-store sequence;
   computer program instructions stored on at least one of the computer readable storage devices for execution by at least one of the processors via at least one of the computer readable memories for determining whether the breakpoint will cause the load-store sequence to repeatedly fail;
   computer program instructions stored on at least one of the computer readable storage devices for execution by at least one of the processors via at least one of the computer readable memories for, responsive to determining that the breakpoint will cause the load-store sequence to repeatedly fail, displaying a warning to a user when the breakpoint is within the load-store sequence;
   computer program instructions stored on at least one of the computer readable storage devices for execution by at least one of the processors via at least one of the computer readable memories for determining locations for at least one alternate breakpoint, wherein the alternate breakpoint is not within the load-store sequence;
   computer program instructions stored on at least one of the computer readable storage devices for execution by at least one of the processors via at least one of the computer readable memories for removing the breakpoint from the program in response to a first user command; and
   computer program instructions stored on at least one of the computer readable storage devices for execution by at least one of the processors via at least one of the computer readable memories for setting at least one alternate breakpoint outside of the load-store sequence in response to a second user command.

10. The system of claim 9, wherein a processor is operable to reserve loads from a common memory and the processor is operable to store to the common memory when the reserve remains intact.

11. The system of claim 9, wherein a processor sets the breakpoint in response to a user command for setting the breakpoint at a particular part of the program.

12. The system of claim 9, wherein a processor sets the breakpoint in response to a user command for stepping through the program.

13. The system of claim 9, wherein the processor will repeatedly execute the load-store sequence until the breakpoint is removed from within the load-store sequence.

14. The system of claim 9, wherein a processor, in response to the user input device, removes the breakpoint from within the load-store sequence.

\* \* \* \* \*